(12) United States Patent
Kurian et al.

(10) Patent No.: US 10,659,388 B1
(45) Date of Patent: May 19, 2020

(54) TRANSACTION PROCESSING THROTTLE WITH DYNAMIC TRANSACTION LOAD BALANCING AND TRANSACTION STARVATION PREVENTION

(71) Applicant: Bank of America Corporation, Charlotte, NC (US)

(72) Inventors: Manu Kurian, Dallas, TX (US); Jason T. Findley, Jacksonville, FL (US); Jayachandra Varma, Irving, TX (US); Gopikrishna Nemalikanti, Frisco, TX (US); Saritha Vrittamani, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/400,140

(22) Filed: May 1, 2019

(51) Int. Cl.
  *H04L 12/803* (2013.01)
  *H04L 12/927* (2013.01)
  (Continued)

(52) U.S. Cl.
  CPC ........ *H04L 47/801* (2013.01); *H04L 41/0681* (2013.01); *H04L 41/16* (2013.01); *H04L 43/04* (2013.01); *H04L 47/125* (2013.01); *H04L 47/762* (2013.01); *H04L 47/805* (2013.01); *H04L 47/826* (2013.01)

(58) Field of Classification Search
  CPC ..... H04L 41/0681; H04L 41/16; H04L 43/04; H04L 47/125; H04L 47/762; H04L 47/801; H04L 47/805; H04L 47/826; G06T 1/0007; H04W 16/14; H04W 24/08; H04W 52/02;
  (Continued)

(56) References Cited

U.S. PATENT DOCUMENTS

| 7,562,143 B2 | 7/2009 | Fellenstein et al. |
| 7,949,677 B2 | 5/2011 | Croft et al. |

(Continued)

OTHER PUBLICATIONS

"Web Crawler," https://www.sciencedaily.com/terms/web_crawler.htm, Retrieved on Apr. 9, 2019.

*Primary Examiner* — Le H Luu
(74) *Attorney, Agent, or Firm* — Weiss & Arons LLP; Michael A. Springs, Esq.

(57) ABSTRACT

A method for throttling an allocation of resources for processing digital transmissions is provided. The method may include receiving initial digital transmissions from a plurality of client systems and analyzing the initial digital transmissions. The analyzing may determine a cluster of digital transmissions, an amount of resources for processing the cluster and a time-window for processing the cluster. The method may further include allocating the determined amount of resources to each of the clusters. The method may also include processing recurrently, for each of the systems, digital transmissions received after the initial digital transmissions. Concurrently with the periodic processing, the method may include, for each client system, monitoring digital transmissions including recording a transmission log, identifying changes in the log, assigning a credibility score and throttling, dynamically, the amount of resources allocated, based on the credibility score and the identified change.

20 Claims, 4 Drawing Sheets

(51) Int. Cl.
*H04L 12/24* (2006.01)
*H04L 12/26* (2006.01)
*H04L 12/923* (2013.01)
*H04L 12/911* (2013.01)

(58) Field of Classification Search
CPC . H04W 72/02; H04W 72/04; H04W 72/1268; H04W 72/1289
See application file for complete search history.

(56) References Cited

U.S. PATENT DOCUMENTS

| | | |
|---|---|---|
| 8,041,690 B2 | 10/2011 | Newport et al. |
| 8,051,180 B2 | 11/2011 | Mazzaferri et al. |
| 8,140,371 B2 | 3/2012 | Franz et al. |
| 8,341,270 B2 | 12/2012 | Mazzaferri et al. |
| 8,352,954 B2 | 1/2013 | Gokhale et al. |
| 8,417,762 B2 | 4/2013 | Branson et al. |
| 8,656,403 B2 | 2/2014 | An et al. |
| 8,805,984 B2 | 8/2014 | Markus et al. |
| 8,839,254 B2 | 9/2014 | Horvitz et al. |
| 8,917,744 B2 | 12/2014 | Childress et al. |
| 9,262,226 B2 | 2/2016 | Gokhale et al. |
| 9,904,578 B2 | 2/2018 | Schimpf et al. |
| 2016/0226703 A1* | 8/2016 | Grinshpun ............ H04W 24/08 |
| 2018/0191634 A1* | 7/2018 | Karthikeyan ......... H04L 47/805 |
| 2018/0198572 A1* | 7/2018 | Wang ................... H04L 1/1854 |
| 2019/0028865 A1* | 1/2019 | Raleigh ................ G06T 1/0007 |
| 2019/0075581 A1* | 3/2019 | Salem ............... H04W 72/1289 |
| 2019/0098644 A1* | 3/2019 | Loehr ............... H04W 72/1268 |
| 2019/0124637 A1* | 4/2019 | Li ........................ H04W 72/04 |
| 2019/0253896 A1* | 8/2019 | Aydin .................. H04W 16/14 |
| 2019/0335423 A1* | 10/2019 | Wu ........................ H04L 5/003 |

\* cited by examiner

| Client A | Digital Transmissions | Time of Receipt of transmissions |
|---|---|---|
| 1/1/2019 | 1,000 | 3 - 4 PM |
| 1/2/2019 | 1,000 | 2 - 3 PM |
| 1/3/2019 | 1,000 | 2 - 3 PM |
| 1/4/2019 | 1,000 | 2 - 3 PM |
| 1/5/2019 | 1,000 | 2 - 3 PM |

FIG. 2

| Client B | Digital Transmissions | Time of Receipt of transmissions |
|---|---|---|
| 1/1/2019 | 1,000 | 3 - 4 PM |
| 1/2/2019 | 1,100 | 3 - 4 PM |
| 1/3/2019 | 1,250 | 3 - 4 PM |
| 1/4/2019 | 1,300 | 3 - 4 PM |
| 1/5/2019 | 1,350 | 3 - 4 PM |

TRANSACTION PROCESSING THROTTLE WITH DYNAMIC TRANSACTION LOAD BALANCING AND TRANSACTION STARVATION PREVENTION

FIELD OF TECHNOLOGY

Aspects of the invention relate to digital transmissions. Specifically, aspects of the invention relate to systems and methods for throttling the allocation of resources for the processing of digital transmissions.

BACKGROUND OF THE DISCLOSURE

Processing transmissions electronically are commonly performed using digital transaction processing systems. Transmissions may include transactions such as purchases, sales, trades, and other suitable transactions.

The processing of the digital transmissions within digital systems entails the utilization of resources. Resources may include memory, processing power, communication bandwidth, electricity, and other suitable digital resources.

Transaction load balancing is fundamental to the success of digital transaction processing systems. Load balancing may include properly allocating amounts of resources for processing the transactions at the appropriate time. Not allocating sufficient resources may leave one or more entities susceptible to overloading available resources. For example, multiple transmissions may be received at around the same time. The multiple transmissions may attempt to utilize the same resources thereby overloading the resources. On the other hand, unallocated resources may remain exposed to vulnerabilities.

Furthermore, when allocating an unnecessary amount of resources to an entity, other entities may suffer from starvation of available resources. When overloaded, some or all of the multiple transmissions may suffer in quality, or may fail altogether.

It would be desirable, therefore, to have systems and methods for monitoring and adjusting, in real-time, the allocation of resources amongst a plurality of entity systems.

SUMMARY OF THE DISCLOSURE

A method for throttling an allocation of resources for processing digital transmissions is provided. The method may include receiving initial digital transmissions. The initial digital transmissions may be received from a plurality of client systems. The transmissions may include one or more transactions. The transactions included in the transmissions may include purchases, sales, trades, and other suitable transactions that may be processed and executed electronically.

Following the receipt of the initial digital transmissions from each client system, the method may include analyzing the initial digital transmissions. The analyzing may include determining a cluster of digital transmissions requiring periodic processing. The analyzing may also include determining an amount of resources needed for processing the cluster of digital transmissions. The resources may be digital resources. The resources may include, but are not limited to, memory, processing power, and/or communication bandwidth. The analyzing may also include determining a time-window for processing the cluster.

The method may further include allocating the determined amount of resources to each of the clusters. The allocating may be for the processing of the clusters during the determined time-window. Following the processing of the initial digital transmissions received from each client system, the method may include processing periodically, for each of the systems, digital transmissions received after the initial digital transmissions.

Concurrently with the periodic processing, the method may include monitoring recurrently, the digital transmissions received from the client systems. The monitoring may include recording a transmission log for each client system. The transmission log may record a time of receipt of the transmissions. The transmission log may also record a volume of transmissions received.

The method may further include, concurrent with the periodic processing, identifying a change in a volume of transmissions received during one or more first pre-determined time intervals and identifying a change in the time of receipt of the transmissions.

The method may also include, concurrent with the periodic processing, assigning a credibility score to each client system. The credibility score may be based on a total volume of transmissions received during a second pre-determined time interval. The credibility score may also be based on a total dollar value of the digital transmissions.

The method may further include, concurrent with the periodic processing, throttling, dynamically, the amount of resources allocated, for each of the client systems. The throttling may be based on the credibility score and the identified changes.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A digital transmission processing computer system is provided. The digital transmissions may be received from a plurality of client systems. The computer system may enable throttling the allocation of digital resources while processing the digital transmissions.

The digital transmissions may each include a payload and metadata. The payload may include content that satisfies the purpose of the transmission, and the metadata may include information about the payload and/or transmission.

In some embodiments, the transmissions may be transactions. The transmissions may include one or more transactions. The transactions included in the transmissions may include purchases, sales, trades, and other suitable transactions that may be processed and executed electronically.

In other embodiments, the payload of a transmission may be received by a financial institution. The payload may include files, documents, contracts, or any other data suitable for various financial transactions, e.g., payment processing. The metadata associated with the transmission may include any suitable information about the transmission, such as a sender of the transmission, a status or classification of the transmission, nature of the payload, a size of the transmission or payload, a location (e.g. of a source or destination) of the transmission, and/or a timestamp (e.g., a date and/or a time of day) of the transmission.

Processing the transmissions may include storing all or part of the transmissions. Processing the transmissions may include conducting a search, making a calculation, forwarding the transmissions to another location (internal or external to the entity), and/or executing any suitable digital process associated with the transmissions.

The system may also include an analysis module. The analysis module may be configured to analyze initial digital transmissions being received from the plurality of client systems. The analysis may enable a determination of a portion of resources allocated for each client system.

The analysis module may also be configured to analyze a cluster of digital transmissions necessitating periodic processing from each client system. The cluster of digital transmissions received from each client system may differ in size. A cluster from one client system may include a small volume of transmissions. A cluster from a second client may include a larger volume of transmissions. Despite the volume of transmissions, the amount of resources needed may differ depending on the type of transmissions being received.

Therefore, the analyzing may also include analyzing an amount of resources needed for processing the cluster. The resources may include memory, processing power, and/or communication bandwidth. The analyzing may further include analyzing a time-window for processing the cluster. The time-window may be based on the time of the receipt of the digital transmissions, from the client system.

The system may also include an allocation module. The allocation module may be configured to allocate the determined portion of resources to each of the client systems based on the analysis. The allocation may be a periodic allocation. The periodic allocation may be based on the time of receipt of the digital transmissions from each client system.

The system may also include a processor. The processor may be configured to process the initial digital transmissions received.

Following the processing of the initial digital transmissions, the processor may also be configured to allocate and process periodically digital transmissions received after the initial digital transmissions.

The allocating may be an allocation of a portion of digital resources for the transmission. The digital resources may include memory, processing power, communication bandwidth, energy such as electricity, and/or any other suitable resources. Allocating the portion of digital resources for transmissions may reserve an amount of the digital resources for the transmission. Allocating the portion of digital resources may also include reserving the digital resources for a certain amount of time. Allocating the digital resources may prevent overloading of the digital resources.

Furthermore, allocating the portion of digital resources based on the metadata may provide a relatively precise estimate of the amount of resources needed for the transmission. Allocating a precise amount may reduce wasteful allocation of resources. Wasteful allocation may occur when resources are allocated for a transmission that does not need them, preventing other transmissions from utilizing the unused resources. Allocating a precise amount, by contrast, may enable a high utilization rate of the resources.

Allocating the portion of digital resources based on metadata may include a predefined function that maps an input of metadata to an output of resource allocation. For example, a transmission of a certain size may be allocated a certain amount of processing power, memory, and/or bandwidth.

Following allocation, the processor may process the digital transmissions received from each client system.

Some client systems may transmit their digital transmissions for processing, at the end of business each day. Other client systems may transmit their digital transmissions for processing, at the beginning of each business day. Still other client systems may transmit their digital transmissions for processing, a few times a day.

An Artificial Intelligent ("AI") tool may also be included within the system. The AI tool may be configured to monitor the digital transmissions received from the client systems. The AI tool may monitor the digital transmissions from the time of receipt of the transmissions from the client systems.

The monitoring, via the AI tool, may be concurrent with the periodic processing of the transmissions. By monitoring simultaneously with the processing, the system may be enabled to dynamically shift the allocation of resources and control and avoid resource traffic.

The monitoring, via the AI tool, may be a recurrent monitoring. The monitoring may be repeated and logged after an end of each period. The period may be every half a day. The period may be once a day. The period may be twice a week. The period may be once a week. The period may be every half a month. The period may be once a month.

The AI tool may also be configured to, concurrent with the periodic processing, record a transmission log for each client system. The transmission log may be stored in a database within the system. The transmission log may enable generating and determining repeated patterns associated with the transmissions from each client system. The patterns may be determined based on the amount of transmissions typically being received, the time of day of receipt of the transmissions and the amount of resources typically allocated for the transmission. By determining repeated patterns, the system may be enabled to appropriately allocate an amount of resources at the appropriate time during each period.

The recording may include logging a time of receipt of the transmissions. The recording may also include logging a volume of transmissions received. The recording may further include logging the metadata associated with each transmission.

The AI tool may also be configured to, concurrent with the periodic processing, identify a change in a volume of transmissions received during one or more first pre-determined time intervals.

The identified change may be a change in the pattern generated based on the recorded transmission log. The identified change may be a change in an amount of transmissions received from a client system compared to a previous one or more amounts of transmissions received from the same client system. The identified change may be a change in time of receipt of transmissions from the client compared to the time of receipt of transmissions from one or more previous transmissions as recorded on the transmission log.

The first pre-determined time interval may be a different time interval for each client system. The first pre-determined time interval may be the same time, for each client system. The first pre-determined interval may be an interval with a smaller span of time in between each interval. The first pre-determined interval may occur hourly. The first pre-determined interval may occur daily.

When a change occurs, the AI tool may be enabled to determine the change and throttle the allocation of resources based on the change and based on the other incoming digital transmissions from the plurality of client systems.

For example, the transmission log may record, daily, the time of receipt of the transmissions received from each client system. The AI tool may monitor, daily, the time of receipt. When a change occurs, the AI tool may monitor whether the change is consistent over a number of days or if the change may be a one time change. When the change is consistent, the system may alter the time of processing the transmissions based on the change and may adjust the allocation of resources during that time for any one or more client systems that may need to be adjusted.

In some embodiments, an application request for a volume of digital transmissions outside an expected parameter of an application request may be received. In response to the application request, the system may be configured to combine, as a multiplex transmission, at least a portion of the volume of digital transmissions that are determined to be comparable, to enable timely processing. A multiplex transmission enables a large plurality of transmissions to be combined and processed as a single transmission. Following the processing of the multiplex transmission, the results may be divided and distributed appropriately. Comparable transmissions may include multiple transmissions for a similar transaction. For example, if there a plurality of transactions associated with a stock purchase, the system may combine the plurality of stock transactions as a single transaction to ensure timely processing.

The AI tool may further be configured to assign a credibility score to each client system during a second pre-determined time interval. The second pre-determined time interval may be an interval with a lengthier span of time in between each interval compared to the span of time in between each of the first pre-determined time intervals. The second pre-determined interval may occur once a week. The AI tool may accrue details of digital transmissions for each system over five business days prior to assigning a credibility score. The credibility score may be assigned based on a total volume of transmissions received. The credibility score may also be assigned based on a total dollar value of the digital transmissions.

The dollar value associated with the digital transmissions may be the actual cost associated with each transmission. For example, when an entity transmits the digital transmissions from user payments, for processing at the end of the business day, the dollar value is the cost of the transmission, i.e. —the actual cost of a user's purchase being charged to the credit card. The greater the cost associated with each digital transmission, the greater the percentage of profit the system may receive for the processing of the transmission.

In some embodiments, a credibility score may further be based on a profile of the corporation associated with each client system. For example, a large corporation having a high net worth may score higher than a smaller corporation having a lower net worth.

In certain circumstances, the total volume of transmissions may increase over a span of time. In other circumstances, the total volume of transmissions may decrease and/or fluctuate over time. Based on machine learning, the AI tool may compare a total volume of digital transmissions from one interval to a total from a previous interval and adjust the credibility score accordingly.

In some embodiments, the credibility score may be based on the total volume and the total dollar value of the digital transmissions. In other embodiments, the credibility score may be based solely on the volume of the digital transmissions. Furthermore, the credibility score, in certain embodiments, may be based further on a credit history, payment history and/or other client behavior trends associated with an entity of the client system.

Concurrent with the periodic processing and based on AI, the allocation module may be further configured to, dynamically throttle, the amount of resources allocated for each of the systems. The throttling of the amount of resources may be based on the credibility score. The throttling of the amount of resources may also be based on a one or more identified changes in the time of receipt of the transmissions and/or a change in the volume of received transmissions for each client system.

By adjusting and throttling the allocation of resources, in real-time, it may alleviate wasting available resources. It may also avoid potential delays that may be due to temporary inconsistencies in the transmissions.

The throttling may include increasing the amount of resources for digital transmissions from client systems with a credibility score greater than a pre-determined threshold level. The throttling may include decreasing the amount of resources for digital transmissions from client systems with a credibility score lower than the pre-determined threshold level.

In another embodiment, a method for authenticating the allocation of resources for the processing of digital transmissions is provided. The method may include identifying an application request. The application request may be a request, from a sender, to process a volume of digital transmissions. The volume may be an amount of transmissions outside an expected parameter of an amount of transmissions received in an application request.

Prior to processing the volume of digital transmissions outside the expected parameter, the method may include, quarantining the transmissions. The quarantining may enable authenticating the request. The method may include, determining a validity of the request. The determination may be enabled by transmitting an alert message to an entity assumed to be associated with the application request to confirm the application request.

In some embodiments, the method may also include performing a content scan on the data and documents included in the transmission in order to authenticate the request. The content scan may include scanning each document and determine the accuracy and legitimacy based on documents previously received. The content scan may enable determining whether an outside may be attempting to use system resources.

In response to the determining the validity of the request, the method may include releasing the volume of digital transmissions from quarantine for processing.

In the event that the application request is determined not to be valid, the method may further include rejecting the volume of digital transmissions. The rejecting may include releasing the of digital transmissions from quarantine and deleting the digital transmissions from the data center resources.

The method may further include distributing the volume of transmissions amongst digital resources in a plurality of data centers for processing. Following the distribution, the method may include processing the volume of digital transmissions amongst the plurality of data center resources.

By distributing the volume of transmissions amongst the plurality of data center resources for processing, it enables processing the volume of transmissions simultaneous to the processing of other incoming digital transmissions without overloading the resources.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
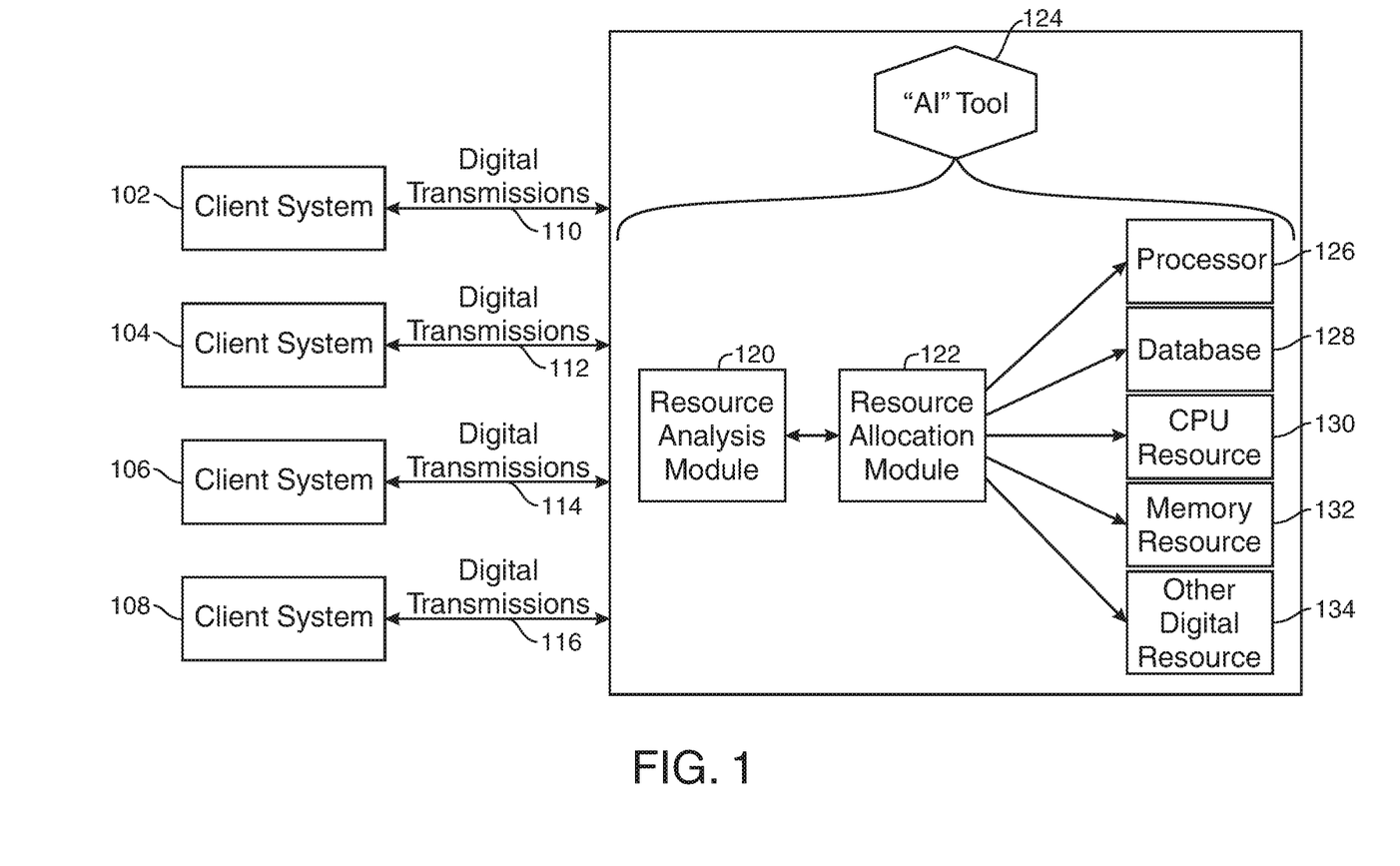
FIG. 1 shows an illustrative system in accordance with principles of the invention.

FIG. 1 shows an exemplary transmission processing computer system ("TPS") in accordance with principles of the invention. System 100 may be in communication with a plurality of client systems. Client system 102 may transmit transmission 110 to the TPS 118. Client system 104 may transmit transmission 112 to the TPS 118. Client system 106 may transmit transmission 114 to the TPS 118. Client system 108 may transmit transmissions 116 to the transmission processing system 118.

It should be appreciated that each of transmissions 110-116 may include a single transmission and/or a plurality of transmissions The TPS 118 may include a resource analysis module 120. The resource analysis module 120 may be configured to receive the transmissions 110-116. The resource analysis module may analyze metadata associated with each transmission to enable determination of the amount of resources required for each transmission and a time of day for processing each transmission.

The TPS 118 may also include a resource allocation module 122. The resource allocation module 122 may be configured to, based on the analysis, allocate resources to process the transmissions.

TPS 118 may also include processor 126. Processor 126 may be configured to process the transmissions once the allocation of the resources is allocated. The TPS 118 may also include database 128 configured to store all data associated with the transmissions. Database 128 may also store a log of the details associated with each transmission throughout pre-determined time intervals. TPS 118 may also include a plurality of digital resources. The resources may include CPU resource 130, memory resource 132 and one or more other digital resources 134. The TPS 118 may also include an AI tool 124. The AI tool 124 may monitor the analysis, allocation and processing of the digital transmissions to enable smart allocation of the resources.

Figure 2:
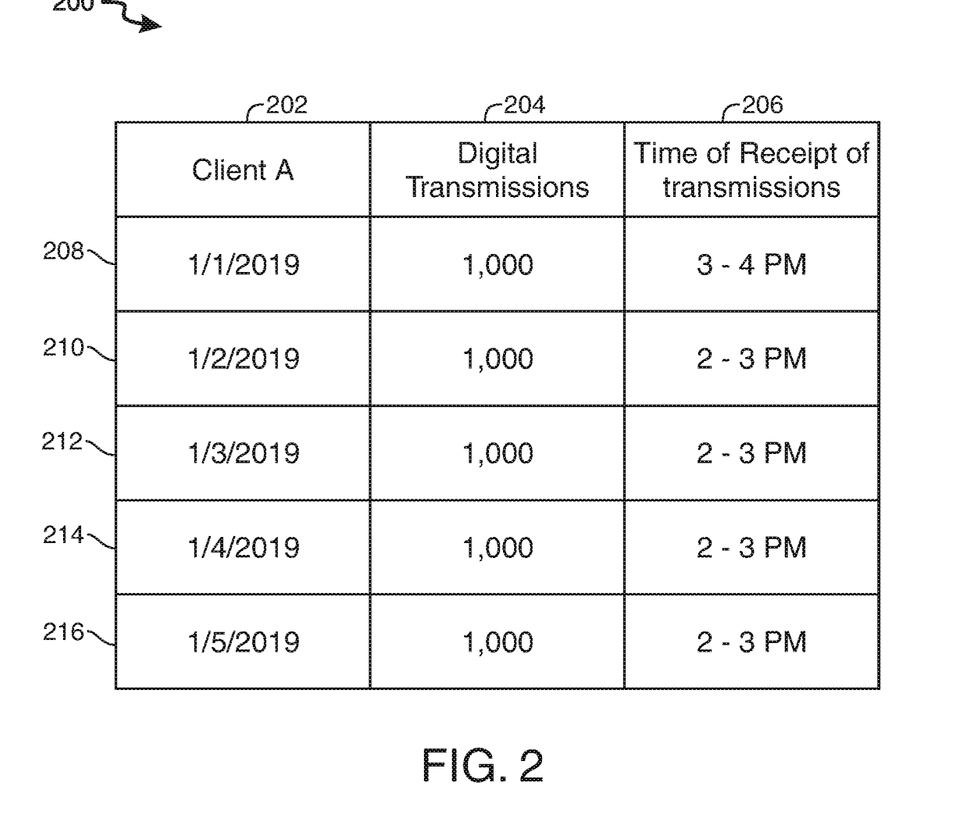
FIG. 2 shows an illustrative diagram in accordance with principles of the invention.

FIG. 2 shows an exemplary diagram of a transmission log 200 for a single client in the system in accordance with principles of the invention. The amount of transmissions received from client A 202 may be recorded in column 204. The time of receipt of each transmission and/or cluster of transmissions may be shown at column 206.

Log 200 may show a cycle of 5 business days of data associated with transmissions received from client A 202. At row 208, Jan. 1, 2019, client A transmits 1000 digital transmissions to be processed. The transmissions are received between 3 pm and 4 pm. Since the transmissions from the prior week may have also been received between 3 pm and 4 pm, the system may be configured to begin processing the transmissions at 4:05 pm.

At row 210, Jan. 2, 2019, client A transmits 1000 digital transmissions to be processed. The transmissions are received between 2 pm and 3 pm. The system, using machine learning, may monitor the time of receipt of the transmissions over a threshold number of days to determine whether the change may be a temporary change in receipt of transmissions or a more permanent and recurrent change in receipt of transmissions.

At row 212, Jan. 3, 3019, client A transmits 1000 digital transmissions to be processed. The transmissions are received between 2 pm and 3 pm. At row 214, Jan. 4, 2019, client A transmits 1000 digital transmissions to be processed. The transmissions are received between 2 pm and 3 pm. At row 216, Jan. 5, 2019, client A transmits 1000 digital transmissions to be processed. The transmissions are received between 2 pm and 3 pm. The transmissions received on Jan. 5, 2019, may be processed at 3:15 pm, based on the change in pattern of the receipt of transmissions from client A 202.

Figure 3:
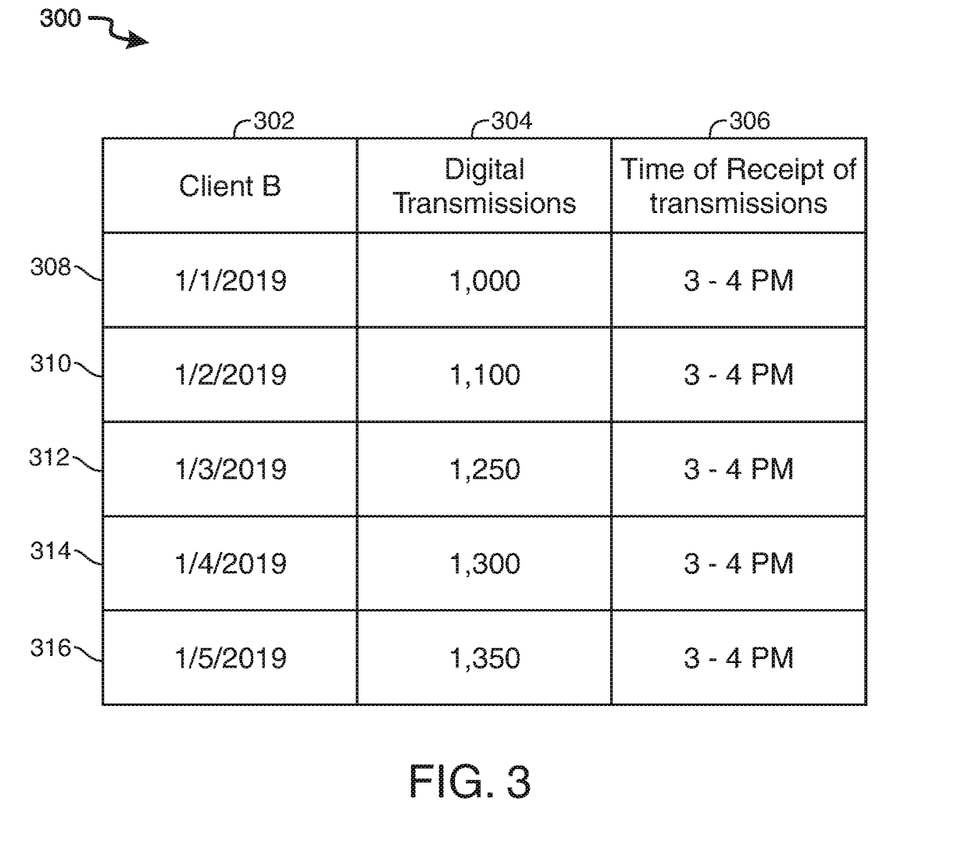
FIG. 3 shows another illustrative diagram in accordance with principles of the invention.

FIG. 3 shows an exemplary diagram of a transmission log 300 for a single client in the system in accordance with principles of the invention. The amount of transmissions received from client B 302 may be recorded in column 304. The time of receipt of each transmission and/or cluster of transmissions may be shown at column 306.

Log 300 may show a cycle of 5 business days of data associated with transmissions received from client B 302. At row 308, Jan. 1, 2019, client B transmits 1000 digital transmissions to be processed. The transmissions are received between 3 pm and 4 pm. Since the transmissions from the prior week may have also been received between 3 pm and 4 pm, the system may be configured to begin processing the transmissions at 4:05 pm. The system may be further configured to allocate resources for the 1000 transmissions at 4:05 pm along with transmissions being processed at the same time from other client systems.

At row 310, Jan. 2, 2019, client B transmits 1100 digital transmissions to be processed. The transmissions are received between 3 pm and 4 pm. The system, using machine learning, may monitor the amount of transmissions over a threshold number of days to determine whether the change may be a temporary change in amount of transmissions or a more permanent and recurrent change in the amount of transmissions.

At row 312, Jan. 3, 3019, client B transmits 1250 digital transmissions to be processed. The transmissions are received between 3 pm and 4 pm. At row 214, Jan. 4, 2019, client B transmits 1300 digital transmissions to be processed. The transmissions are received between 3 pm and 4 pm. At row 216, Jan. 5, 2019, client B transmits 1350 digital transmissions to be processed. The transmissions are received between 3 pm and 4 pm. The allocation of resources may be throttled based on the increase in the amount of transmissions received over a threshold number of days. The time of processing may be adjusted since the number of transmissions increased.

Figure 4:
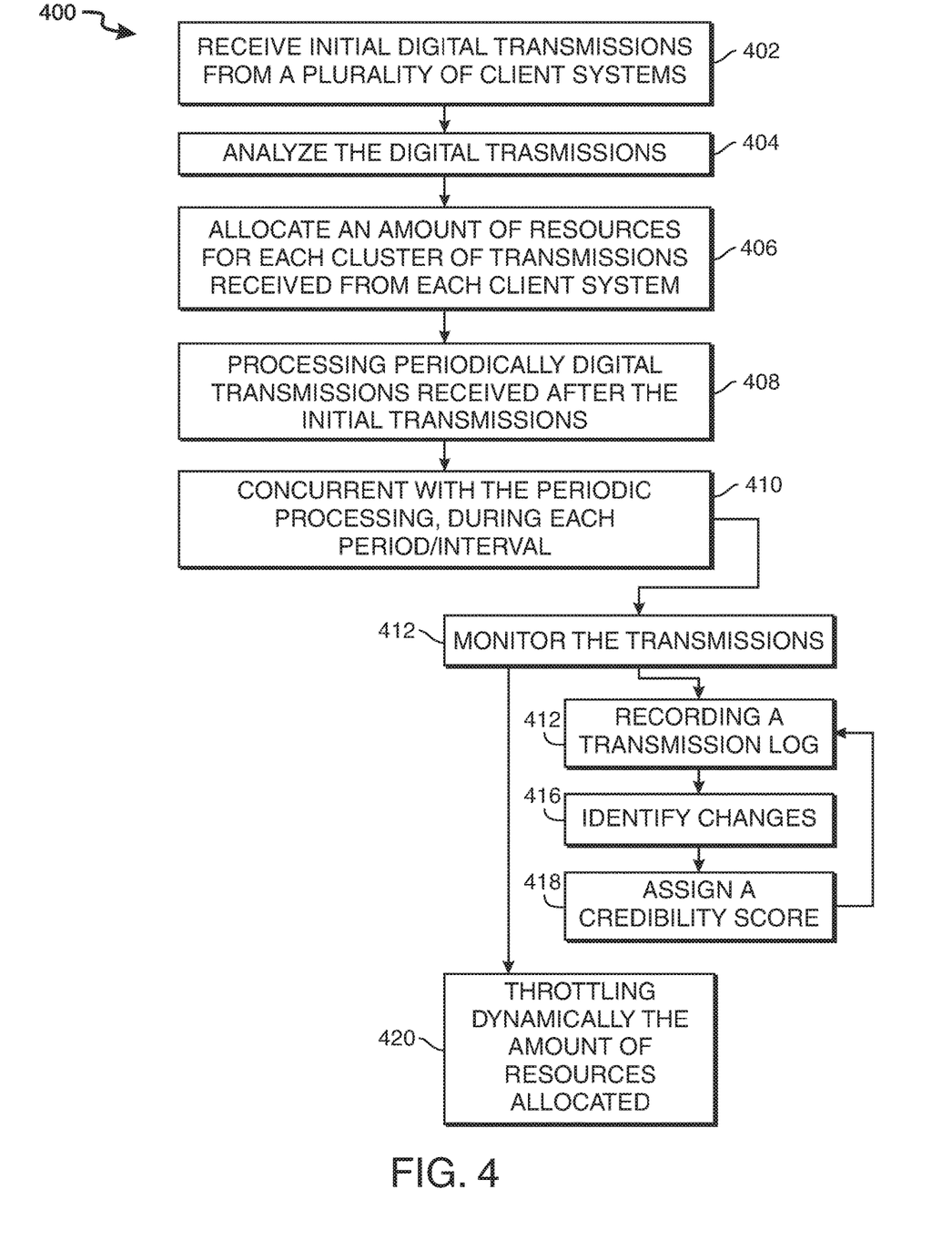
FIG. 4 shows an illustrative flowchart in accordance with principles of the invention.

FIG. 4 shows illustrative flowchart 400 of a system in accordance with aspects of the disclosure. Flowchart 400 may show one exemplary embodiment of the disclosure, other embodiments may include any other steps, elements, combinations, and/or sequences other than those shown in flowchart 400.

The system may receive initial digital transmissions from a plurality of client systems. The system may analyze the transmissions at step 404. The system may allocate an amount of resources for each cluster of transmissions received from each client system at step 406. Resource allocation may include deriving an amount and/or time for resource allocation, as well as actually scheduling and reserving the resources for the transmission to utilize. The system may process periodically the digital transmissions received after the processing of the initial digital transmissions at step 408.

Concurrent with the periodic processing, the system may perform, repeatedly, a number of actions throughout the processing as shown at step 410. The system may monitor the transmissions at step 412. The system may incorporate machine learning components and AI tools to monitor the processing. The monitoring may include recording a transmission log at step 414. The monitoring may also include identifying any change in the amount of transmissions and the time of receipt as shown at step 416. The monitoring may also include assigning a credibility score to each client system as shown at step 418. Based on the monitoring, the system may be configured to throttle, dynamically, the amount of resources allocated, as shown at step 420.

Thus, methods and apparatus for throttling the allocation of digital resources while processing the digital transmissions have been provided. Persons skilled in the art will appreciate that the present invention can be practiced by other than the described embodiments, which are presented for purposes of illustration rather than of limitation. The present invention is limited only by the claims that follow.

What is claimed is:

1. A method for throttling an allocation of resources for processing digital transmissions, the method comprising:
   receiving initial digital transmissions from a plurality of client systems;
   analyzing the initial digital transmissions received from each of the client systems to determine:
      a cluster of digital transmissions, the cluster comprising a sufficient number as to necessitate periodic processing;
      an amount of resources for processing the cluster;
      a time-window for processing the cluster;
   allocating the determined amount of resources to each of the clusters for processing of the clusters during the determined time-window;
   processing recurrently, for each of the client systems, digital transmissions received after the initial digital transmissions;
   concurrently with the periodic processing:
      monitoring recurrently, digital transmissions received from the client systems, the monitoring including:
         recording a transmission log for each client system including recording:
            a time of receipt of the digital transmissions; and
            a volume of digital transmissions received;
         identifying a change in the volume of digital transmissions received and a change in the time of receipt of the digital transmissions over a first pre-determined time interval;
         assigning a credibility score to each client system based on a total volume of digital transmissions and a total dollar value of the digital transmissions received during a second pre-determined time interval;
      throttling, dynamically, the amount of resources allocated, for each of the client systems, based on the credibility score and the identified changes.

2. The method of claim 1 wherein the periodic processing represents a daily recurrence of processing.

3. The method of claim 1 wherein the credibility score for each client system is further based on a credit history and a payment history associated with the client system.

4. The method of claim 1 wherein the resources comprise memory, processing power, and/or communication bandwidth.

5. The method of claim 1 wherein the second pre-determined time interval is a weekly time interval.

6. The method of claim 1 further comprising, adjusting the credibility score for each client system based on the change in the total volume of digital transmissions received and a change in the total dollar value associated with the digital transmissions.

7. The method of claim 6 wherein the throttling comprises:
   increasing the amount of digital resources for digital transmissions from client systems with a credibility score greater than a pre-determined threshold level; and
   decreasing the amount of resources for digital transmissions from client systems with a credibility score lower than the pre-determined threshold level.

8. The method of claim 1 wherein the identifying further comprises identifying an application request for processing a volume of digital transmissions, the volume being outside an expected parameter of the volume of digital transmissions being processed recurrently, received from a first system.

9. The method of claim 8 wherein, in response to the request from the first system, of the application request for processing the volume of digital transmissions outside the expected parameter, the method further comprises:
   overriding the allocation of the amount of resources for each of the systems; and
   diversifying the processing of the volume of digital transmissions across a plurality of resources to prevent blocking the processing of a lower volume of digital transmissions received from a second system within the plurality of systems.

10. The method of claim 8 wherein, in response to the receipt from the first system, of the application request, the method further comprises:
   combining, as a multiplex transmission, at least a portion of the volume of digital transmissions that are determined to be comparable, to enable timely processing.

11. A transmission processing computer system configured for throttling an allocation of digital resources while processing digital transmissions received from a plurality of client systems, the system comprising:
   an analysis module configured to analyze initial digital transmissions being received from the plurality of client systems, to determine a portion of recurring resources allocated for each client system, the analysis comprising, analyzing:
      a cluster of digital transmissions necessitating periodic processing;
      an amount of resources needed for processing the cluster;
      a time-window for processing the cluster;
   an allocation module configured to allocate, as a periodic allocation, the determined portion of resources to each of the client systems based on the analysis;
   a processor configured to process periodically the digital transmissions received after the initial digital transmissions, for each of the client systems;
   concurrent with the periodic processing:
      an Artificial Intelligent ("AI") tool configured to crawl the system, to monitor recurrently, digital transmissions received from the client systems, the AI tool configured to:
         record a transmission log for each client system including recording:

a time of receipt of the digital transmissions; and a volume of digital transmissions received;

identify a change in a volume of digital transmissions received during a first pre-determined time interval and a change in the time of receipt of the digital transmissions;

assign a credibility score to each client system based on an total volume of digital transmissions received during a second pre-determined time interval and a total dollar value of the digital transmissions;

the allocation module further configured to, dynamically throttle, based on the credibility score and the identified changes, the amount of resources allocated for each of the systems.

12. The system of claim 11 wherein the first pre-determined time interval is a daily time interval.

13. The system of claim 11 wherein the second pre-determined time interval is a weekly time interval.

14. The system of claim 11 wherein the credibility score for each client system is further based on a credit history and a payment history associated with the client system.

15. The system of claim 11 wherein the AI tool is further configured to identify an application request for processing a volume of digital transmissions received from a first client system, the volume being outside an expected parameter of an application request.

16. The system of claim 15 wherein, in response to the request from the first client system, the system is further configured to:

override the allocation of the amount of resources for each of the client systems; and diversify processing the volume of digital transmissions across a plurality of resources to prevent blocking the processing of a lower volume of digital transmissions received from a second client system within the plurality of systems.

17. The system of claim 15 wherein, in response to the request from the first client system, the system is further configured to:

combine, as a multiplex transmission, at least a portion of the volume of digital transmissions that are determined to be similar, to enable timely processing.

18. A method for authenticating an allocation of resources for processing digital transmissions, the method comprising:

identifying an application request to process a volume of digital transmissions, the volume being outside an expected parameter of an application request;

prior to processing the digital transmissions, quarantining the transmissions to authenticate the request;

determining a validity of the request;

in response to the determining the validity, releasing the volume of digital transmissions from quarantine;

distributing the volume of digital transmissions amongst resources in a plurality of data centers for processing; and processing the volume of digital transmissions amongst the resources within the plurality of data center resources;

wherein:

the distributing the volume of digital transmissions outside the expected parameter, amongst the plurality of data center resources for processing, enables processing the volume of transmissions simultaneous to processing other incoming digital transmissions without overloading the resources.

19. The method of claim 18, wherein in an event that the application request is determined not to be valid, the method further comprises rejecting the volume of digital transmissions by:

releasing the volume of digital transmissions from quarantine; and deleting the digital transmissions from the resources within the plurality of data centers.

20. The method of claim 18 wherein the determining the validity comprises transmitting an alert message to an entity associated with the application request confirming the application request.

* * * * *